US010572906B2

(12) United States Patent
Goder et al.

(10) Patent No.: US 10,572,906 B2
(45) Date of Patent: Feb. 25, 2020

(54) UNIFIED AUCTION MODEL FOR SUGGESTING RECOMMENDATION UNITS AND AD UNITS

(75) Inventors: Andrey Goder, San Jose, CA (US); David Dawei Ye, Menlo Park, CA (US); Yanxin Shi, Palo Alto, CA (US); John Hegeman, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 815 days.

(21) Appl. No.: 13/549,080

(22) Filed: Jul. 13, 2012

(65) Prior Publication Data

US 2014/0019233 A1 Jan. 16, 2014

(51) Int. Cl.
*G06Q 30/02* (2012.01)
(52) U.S. Cl.
CPC ................ *G06Q 30/0273* (2013.01)
(58) Field of Classification Search
CPC .................................. G06Q 30/0273
USPC .... 705/14.41, 10, 14.55, 14.66, 36 R, 14.54, 705/14.4, 319, 26.41, 26.1; 725/34
See application file for complete search history.

(56) References Cited

U.S. PATENT DOCUMENTS

| 8,190,486 | B1 * | 5/2012 | Ouimet | G06Q 30/02 705/26.1 |
|---|---|---|---|---|
| 8,812,360 | B2 * | 8/2014 | Kendall | G06Q 30/02 705/14.4 |
| 2002/0004735 | A1 * | 1/2002 | Gross | G06Q 30/0214 705/26.41 |
| 2003/0069822 | A1 * | 4/2003 | Ito | G06Q 40/02 705/36 R |
| 2008/0052151 | A1 * | 2/2008 | Xie | G06Q 30/02 705/14.54 |
| 2008/0104026 | A1 * | 5/2008 | Koran | G06F 17/30867 |
| 2009/0112701 | A1 * | 4/2009 | Turpin et al. | 705/10 |
| 2010/0257058 | A1 * | 10/2010 | Karidi | G06Q 30/02 705/14.55 |
| 2010/0287033 | A1 * | 11/2010 | Mathur | G06F 17/30867 705/319 |

(Continued)

FOREIGN PATENT DOCUMENTS

JP 2012063803 A * 3/2012

OTHER PUBLICATIONS

Wei Li, Exploitation and Exploration in a Performance based Contextual Advertising System, 2012 (Year: 2012).*

*Primary Examiner* — Tarek Elchanti
(74) *Attorney, Agent, or Firm* — Fenwick & West LLP

(57) ABSTRACT

A social networking system presents advertisements and recommendation units to its users. The recommendation units suggest actions for the users to increase their engagement with the social networking system or otherwise interact with other users, while the social networking system receives revenue from advertisers for displaying advertisements based on bid values associated with the advertisements. The social networking system determines values for the advertisements and for the recommendation units, where the values are measured in a comparable fashion. This allows the system to rank and select the advertisements and recommendation units together in a unified auction model. For example, the social networking system uses a pacing value to determine values of recommendation units having a common unit of measurement with expected values of advertisements to the social networking system.

20 Claims, 3 Drawing Sheets

(56) References Cited

U.S. PATENT DOCUMENTS

2012/0226564 A1* 9/2012 Mirrokni Banadaki ..................... G06Q 30/0254
705/14.66
2013/0111519 A1* 5/2013 Rice ....................... G06Q 30/02
725/34

* cited by examiner

UNIFIED AUCTION MODEL FOR SUGGESTING RECOMMENDATION UNITS AND AD UNITS

BACKGROUND

The present disclosure generally pertains to providing suggestions and online advertising to users of an online system, such as a social networking system.

Social networking systems enable users (including people, businesses, and other entities) to form connections and interact with other users. Social networking systems can also enrich the user experience by identifying, recording, and using the connections and interactions among the users to suggest actions or provide additional content. For example, a social networking system may infer a user's interest in a particular topic based on the user's interactions with objects related to that topic. In part, this information can also be used to select communications and advertisements tailored to fit the particular interests of each user. That is, advertisements and/or recommendations that are most relevant to a particular user's interests are presented to each user.

Advertisers typically provide compensation to the social networking system in exchange for displaying advertisements from the advertiser. Hence, advertisements presented to a user via the social networking system provide revenue to the social networking system while providing social networking system users with information about goods or services relevant to the users' interests. In addition to receiving compensation for displaying advertisements, social networking systems often seek to increase user interaction with the social networking system. This increased interaction allows the social networking system to obtain more information about its users or to obtain additional users. Increasing the amount of information about its users allows the social networking system to provide a better user experience and also to better identify advertisements of interests to its users, potentially increasing the revenue obtained from advertisers.

A social networking system may seek to increase user engagement or increase its user base by presenting "recommendation units" to its users that identify actions within the social networking system for its users to perform. Unlike advertisements, recommendation units do not directly generate revenue for the social networking system, but rather provide the social networking system with indirect benefits in the form of increased user engagement or an increased number of users. Further, the social networking system may generate recommendation units to encourage a variety of user activities, allowing use of the recommendation units to advance a variety of potential goals.

However, when presenting content to its users, the social networking system has limited display space to present both recommendation units and advertisements so that they are easily visible to the users. While the social networking system may allocate a fixed amount of display space for advertisements and a fixed amount of display space for recommendation units, for a given user at a particular time there may be more recommendation units relevant to the user than can be displayed in the allocated display space. Similarly, more advertisements than the amount that can be displayed in the allocated display space may be available for presentation. Additionally, advertisements are frequently evaluated based on the amount of revenue they bring to the social networking system while recommendation units provide a benefit to the social networking system that is not easily quantifiable and dependent to an extent on the goals of the social networking system. This difference in valuation for the different items makes it difficult to directly compare recommendation units and advertisements to determine how they are displayed to users.

SUMMARY

A social networking system may provide recommendation units and advertisements to a viewing user in addition to content relating to other users of the social networking system to whom the user is connected. To select a combination of advertisements and recommendation units providing the most value to the social networking system, the advertisements and recommendation units are ranked together. This allows the selection of advertisements to account for the value of recommendation units that could otherwise be selected and vice versa. Conventional techniques select advertisements using an auction system that determines a monetary value to the social networking system for serving an advertisement to a user and select recommendation units based on a scoring model. Because conventional techniques value recommendation units and advertisements differently, the two types of content cannot be evaluated together. However, embodiments of the invention convert the measurement of value for advertisements and for recommendation units to a common valuation scheme (e.g., a conversion factor that converts the score for recommendation units to a monetary value, in which advertisements are already measured). The advertisement and the recommendation units are then input into a unified auction system to rank and select a combination of advertisements and/or recommendation units for a given user at a particular point in time.

The recommendation units suggest actions to increase the viewing user's interaction with the social networking system. For example, a recommendation unit provides a suggestion for the viewing user to establish a connection with another user as well as a link enabling the user to do so. In other examples, a recommendation unit encourages the viewing user to invite a friend to an event, identify a friend in a photo, or join a group, among various other types of social interaction. Each recommendation unit is associated with a score based on a value of the viewing user interacting with the recommendation unit (i.e., "converting" the recommendation unit by performing the recommended action) and/or on the likelihood that the viewing user will convert the recommendation unit. The score may be based on prior interaction with recommendation units by the viewing user, other users to whom the viewing user is connected, a probability of the viewing user interacting with the recommendation unit, or other criteria.

In contrast to recommendation units, advertisements are content provided by one or more advertisers that compensate the social networking system for presenting advertisements to the user. Hence, each advertisement is associated with an expected value to the social networking system. For example, an expected value for an advertisement is determined by multiplying a bid amount associated with the advertisement (as provided by an advertiser) by a probability that a user will access the advertisement. As another example, the bid amount is the expected value. Hence, the expected value of an advertisement identifies an amount the social networking system receives if the advertisement is displayed.

The social networking system may display content to a viewing user that includes a combination of recommendation units and advertisements. To select the content, the social networking system determines a recommendation value for each recommendation unit based on its associated score. The recommendation value of a recommendation unit has the same unit of measurement as the expected value for advertisements, allowing recommendation units to be compared to advertisements in a single process. Use of a common unit of measurement for expected value and recommendation value allows advertisements and recommendation units to be ranked in a unified listing, simplifying selection of content, which includes advertisements and recommendation units that are presented to users. For example, using common units of measurement for recommendation value and expected value enables creation of a unified ranking of advertisements and recommendation units from which the social networking system selects content. In one embodiment, an auction process is applied to the expected values of advertisements and the recommendation values of recommendation units, allowing the social networking system to select the recommendation units and advertisements using the common unit of measurement. The selected recommendation units and advertisements are then sent from the social networking system to an electronic device associated with the viewing user.

In one embodiment, the recommendation value of a recommendation unit is determined by scaling the recommendation unit's score by a pacing value. Use of the pacing value allows the amount of advertisements and recommendation units to be varied based on the conversion of the advertisements and recommendation units presented to the user. The social networking system may modify the pacing value so that the total of the recommendation values for recommendation units displayed to users is a specified percentage of revenue received from displaying advertisements to users Additionally, in some embodiments, the social networking system may apply additional rules to the selection of advertisements and/or recommendation units. For example, one or more rules may specify a number of advertisements that are selected and/or a number of recommendation units that are selected.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System

Figure 1:
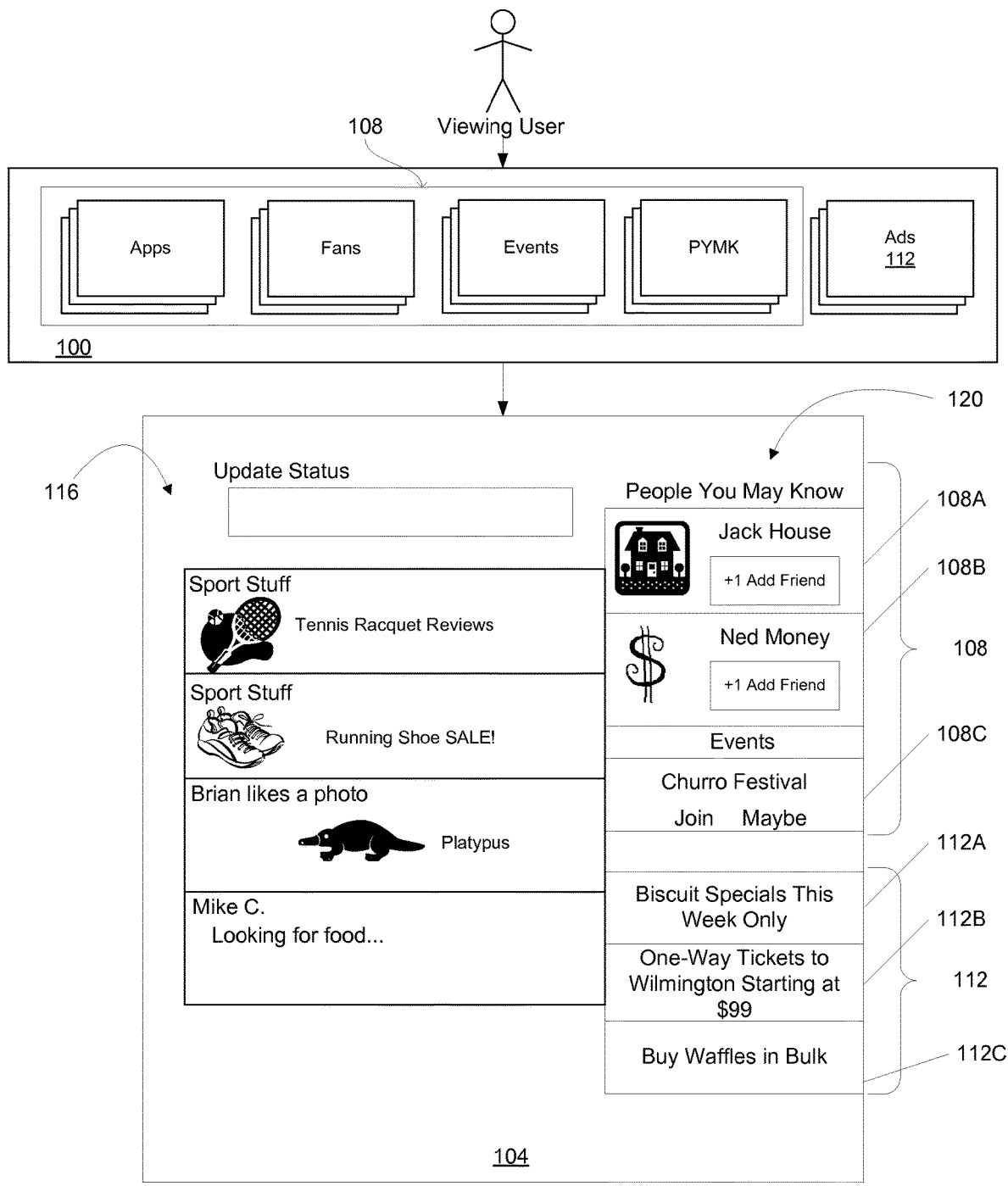
FIG. 1 is a diagram illustrating selection and presentation of content to a user by a social networking system, in accordance with an embodiment of the invention.

FIG. 1 shows an example of a social networking system 100 that provides content to a viewing user of the social networking system 100. In the example shown by FIG. 1, the social networking system 100 provides narrative content 116 and suggestion content 120 to the viewing user. In the example of FIG. 1, the narrative content 116 and the suggestion content 120 are presented in separate regions of a display 104. However, in other embodiments, the narrative content 116 and the suggestion content 120 may be combined or may be organized in the display 104 differently than the example shown in FIG. 1.

The narrative content 116 describes actions taken by other users of the social networking system 100 that are connected to the viewing user. Examples of content included in the narrative content 116 include news stories, media provided to the social networking system 100 (e.g., pictures or videos), status messages of other users of the social networking system, links posted by users to the social networking system, events, plans, groups, pages (e.g., representing an organization or entity), or other content provided by or accessible via the social networking system. In one embodiment, the narrative content 116 is a news feed including stories describing actions taken by other social networking system users connected to the viewing user, a status of social networking system users connected to the viewing user, events in the social networking system 100, content posted by other social networking systems, or similar data. In addition to presenting the narrative content 116, the social networking system 100 may also receive data from the viewing user for inclusion in the narrative content presented to other users.

Additionally, the narrative content 116 may display information from a user profile associated with the viewing user. For example, the narrative content 116 displays actions taken by the viewing user, demographic information about the viewing user, photographs or other media associated with the viewing user, interests about the viewing user, or other data describing attributes of the viewing user.

The suggestion content 120 includes content items suggesting actions for the viewing user to perform and/or content with which the viewing user may interact; the social networking system 100 selects the content included in the suggestion content 120. In one embodiment, content items in the suggestion content 120 are one or more recommendation units 108 and one or more advertisements 112. A recommendation unit 108 suggests an action for the viewing user to perform that increases the viewing user's interaction with the social networking system 100. For example, a recommendation unit 108 suggests other users of the social networking system 100 with whom the viewing user may establish a connection and includes a link for connecting the viewing user to a suggested user. In FIG. 1, recommendation units 108A, 108B are shown illustrating suggestions for connecting the viewing user with other users. As another example, a recommendation unit 108 identifies an event for the viewing user to attend. FIG. 1 shows a recommendation unit 108C identifying an event for the viewing user to attend. Other examples of the recommendation units 108 identify applications for the viewing user to use or download, identify one or more groups of users for the viewing user to join, identify users of the social networking system for whom the viewing user may express a preference, suggest the viewing user invite additional individuals or entities to join the social networking system 100, provide gifts that the viewing user may give to other users, show fan pages that the viewing user may join, other items that may be interesting to the user, or any other suitable action increasing interaction between the viewing user and the social networking system 100.

Hence, the recommendation units 108 suggest actions for the viewing user that increase the engagement with the social networking system 100 or allow the social networking system to interact with more users. This allows the social networking system 100 to obtain additional information about the viewing user or increase the number of users of the social networking system. Each of the recommendation units 108 is associated with a score where the score is based on a value to the social networking system 100 of the viewing user performing the recommended action identified by the candidate recommendation unit, or "converting" the recommendation unit into information for the social networking system 100. For example, the recommendation units 108 that suggest a viewing user invite new users to the social networking system 100 (or establish connections with other social networking system users) are associated with a high score. This high score is due to the conversion of such recommendation units providing additional users to the social networking system 100 or increasing the interaction between the viewing user and other social networking system users, thereby increasing the size or use of the social networking system 100 as a whole. In the preceding examples, when the viewing user converts the recommendation units 108 into an action, the social networking system 100 obtains additional information about the viewing user, allowing it to more accurately identify content of interest to the viewing user, or obtain additional users for the social networking system 100.

The suggestion content 120 also includes one or more advertisements 112, which are content provided by one or more advertisers that compensate the social networking system 100 for presenting the advertisements 112 to the user. In one embodiment, an advertiser associates a bid amount with the advertisement 112 provided to the social networking system 100. The bid amount is used to determine the compensation received by the social networking system 100 if the advertisement 112 is presented to a user, such as the viewing user, or if the user interacts with the displayed advertisement 112. The bid amount is used to determine an expected value to the social networking system 100 of presenting the advertisement 112. For example, the bid amount of the advertisement 112 is multiplied by a probability of the advertisement being converted to determine the expected value of the advertisement. As another example, the bid amount acts as the expected value by specifying an amount of money the social networking system 100 receives from the advertiser if the advertisement 112 is displayed. Other advertisement valuation models may also be applied.

In various embodiments, the suggestion content 120 includes a limited amount of information. For example, the suggestion content 120 may include six "slots" in which content items selected from the recommendation units 108 and the advertisements 112 are displayed. The example suggestion content 120 shown by FIG. 1 includes three advertisements 112A, 112B, 112C and the three recommendation units, 108A, 108B, 108C. In one embodiment, the suggestion content 120 includes a specified number of the recommendation units 108 and a specified number of the advertisements 112. In the preceding example, the suggestion content 120 may include three recommendation units 108 and three advertisements 112. However, in other embodiments, the suggestion content 120 may include a variable number of the recommendation units 108 and a variable number of the advertisements 112, with at least one of each being included in the suggestion content 120.

Accordingly, the social networking system 100 selects advertisements 112 and recommendation units 108 for the suggestion content 120 that maximize the benefit to the social networking system 100 if the viewing user interacts with a recommendation unit 108 or with an advertisement 112. For example, the social networking system 100 includes the recommendation unit 108 having the highest recommendation value in the suggestion content 120 and/or includes the advertisement 112 having the highest expected value in the suggestion content 120. This allows the social networking system 100 to obtain the maximum amount of information if the recommendation unit 108 is converted and/or to obtain the maximum compensation from an advertiser if the advertisement 112 is presented.

As described above, the recommendation units 108 have a score determined by the social networking system 100 based on a value to the social networking system of the viewing user performing the recommended action identified by the candidate recommendation unit, or "converting" the recommendation unit into information for the social networking system. This is in contrast to the advertisements 112, which are associated with an expected value based on a bid amount associated with the advertisements 112 by an advertiser. To simplify selection of the recommendation units 108 and the advertisements 112 for the suggestion content 120, the social networking system 100 converts the score and the expected value into a common unit of measurement, allowing both the recommendation units and the advertisements to be ranked together based on benefit to the social networking system 100. For example, the social networking system 100 determines a recommendation value for a recommendation unit based on its score so that the recommendation value is measured using the same units as the expected value for an advertisement 112.

This allows the social networking system 100 to compare the advertisements 112 and the recommendation units 108 using a common unit of measure. For example, the social networking system 100 generates a unified listing of content items including the advertisements 112 and the recommendation units 108 based on, respectively, expected value and recommendation value, which have the same unit of measurement, and selects the advertisements 112 and the recommendation units 108 from the unified listing. Selecting the advertisements 112 and the recommendation units 108 based on expected values and recommendation values having common units of measurement is further described below in conjunction with FIGS. 3 and 4.

Figure 2:
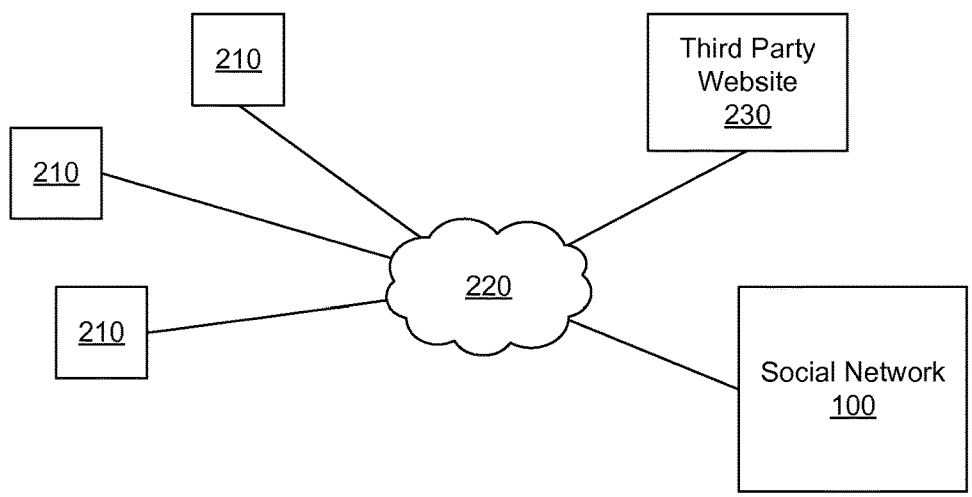
FIG. 2 is a high level block diagram of a system environment for providing content items to users of a social networking system, in accordance with an embodiment of the invention.

FIG. 2 is a high level block diagram illustrating a system environment 200 for the social networking system 100. The system environment 200 comprises one or more client devices 210, a network 220, one or more third-party websites 230 and the social networking system 100. In alternative configurations, different and/or additional components may be included in the system environment 200. The embodiments described herein can be adapted to online systems that are not social networking systems.

The client devices 210 comprise one or more computing devices capable of receiving user input as well as transmitting and/or receiving data via the network 220. In one embodiment, the client device 210 is a conventional computer system, such as a desktop or laptop computer. In another embodiment, a client device 210 may be a device having computer functionality, such as a personal digital assistant (PDA), mobile telephone, smart-phone, or similar device. The client device 210 is configured to communicate via the network 220. In one embodiment, a client device 210 executes an application allowing a user of the client device 210 to interact with the social networking system 100. For example, a client device 210 executes a browser application to enable interaction between the client device 210 and the social networking system 100 via the network 220. In another embodiment, a client device 210 interacts with the social networking system 100 through an application programming interface (API) that runs on the native operating system of the client device 210, such as iOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 230 may be coupled to the network 220 for communicating with the social networking system 100, which is further described below in conjunction with FIG. 3.

Figure 3:
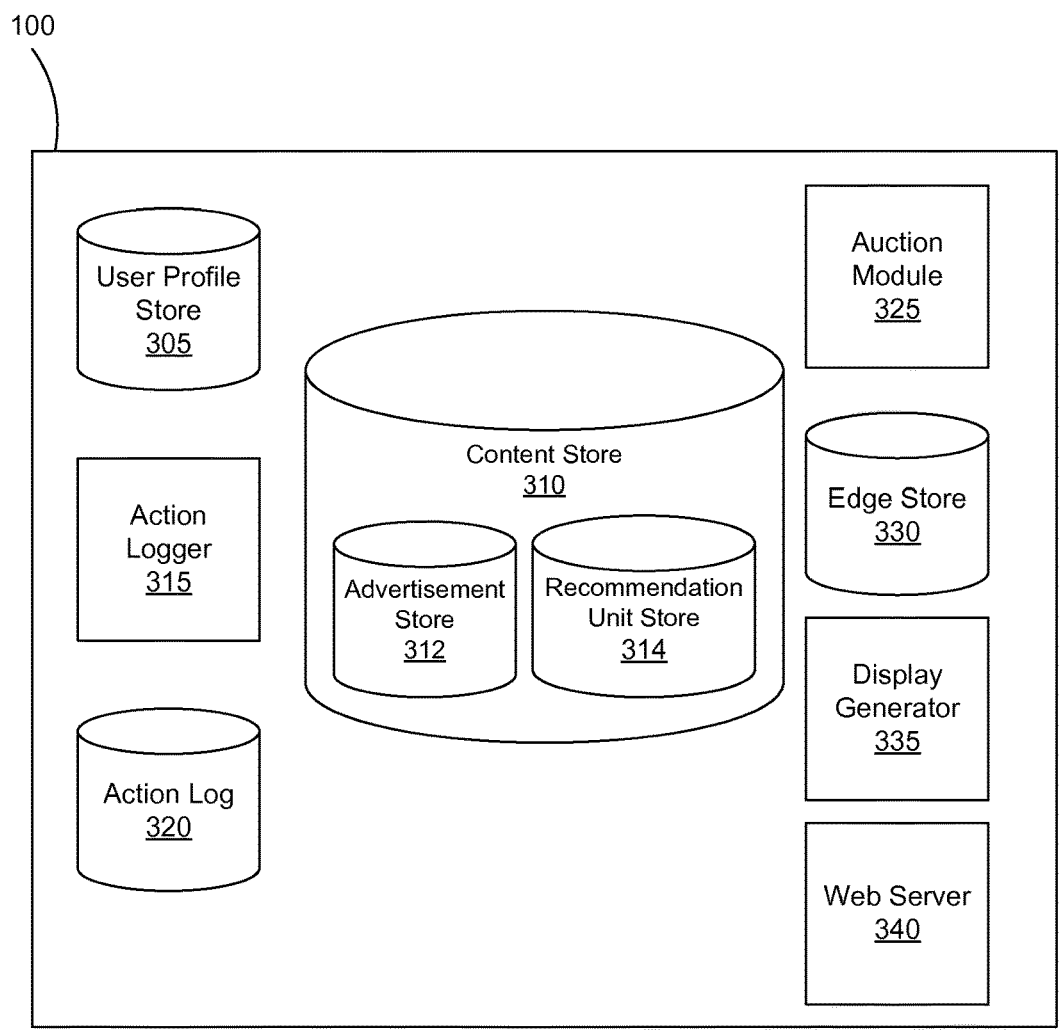
FIG. 3 is a block diagram of a system architecture of a social network, in accordance with an embodiment of the invention.

FIG. 3 is an example block diagram of a system architecture of the social networking system 100. The social networking system 100 includes a user profile store 305, a content store 310, an action logger 315, an action log 320, an auction module 325, an edge store 330, a display generator 335, and a web server 340. In other embodiments, the social networking system 100 may include additional, fewer, or different modules for various applications. Conventional components such as network interfaces, security functions, load balancers, failover servers, management and network operations consoles, and the like are not shown so as to not obscure the details of the system architecture.

Each user of the social networking system 100 is associated with a user profile, which is stored in the user profile store 305. A user profile includes information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in the user profile store 305 describes the users of the social networking system 100, including biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of the social networking system 100 displayed in an image.

The content store 310 stores content items associated with a user profile, such as images, videos, and audio files. Content items from the content store 310 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system, or to increase interaction with the social networking system 100 by displaying content related to users, objects, activities, or functionalities of the social networking system. Examples of social networking content items include suggested connections or suggestions to perform other actions, media provided to, or maintained by, the social networking system 100 (e.g., pictures or videos), status messages or links posted by users to the social networking system, events, groups, pages (e.g., representing an organization or commercial entity), and any other content provided by or accessible via the social networking system.

In one embodiment, the content store 310 includes advertisements and recommendation units. For example, the content store 310 includes an advertisement store 312 that includes advertisements and a recommendation unit store 314 that includes recommendation units. An advertisement included in the advertisement store 312 includes content and a bid amount. The bid amount is associated with an advertisement by an advertiser and is used to determine an expected value, such as monetary compensation, provided by an advertiser to the social networking system 100 if the advertisement is presented to a user, if the advertisement receives a user interaction, or based on any other suitable condition. For example, the bid amount specifies a monetary amount that the social networking system 100 receives from the advertiser if the advertisement is displayed and the expected value is determined by multiplying the bid amount by a probability of the advertisement being accessed.

As described above in conjunction with FIG. 1, a recommendation unit 108 suggests an action for a user to perform that increases the user's interaction with the social networking system 100 or generates new users of the social networking system 100. For example, a recommendation unit suggests connections to other users of the social networking system 100, suggests applications for use by the user, suggests events for the user to join or attend, or other suitable actions. A recommendation unit in the recommendation unit store 314 includes content describing the suggested action for the user and a score. The social networking system 100 determines the score for a recommendation unit based on the value to the social networking system 100 if a user performs the action suggested by the recommendation unit, thereby converting the recommendation unit into data for the social networking system 100.

A variety of factors may be used when determining the score; however, the score is typically proportional to an amount by which a user's interaction, or overall interaction with the social networking system 100, increases if an associated recommendation unit is converted. Examples of factors used to determine a score include an expected probability of conversion, a type of recommendation unit, and/or attributes of the user presented with the recommendation unit. For example, a recommendation unit inviting a new user to join the social networking system 100 may have a higher score than a recommendation unit that connects existing social networking system users because the former provides additional users to the social networking system 100, thereby expanding the exposure of the system to the public.

The action logger 315 receives communications about user actions on and/or off the social networking system 100, and populates the action log 320 with information about user actions. Such actions may include, for example, adding a connection to another user, sending a message to another user, uploading an image, reading a message from another user, viewing content associated with another user, attending an event posted by another user, among others. In addition, a number of actions described in connection with other objects are directed at particular users, so these actions are associated with those users as well. These actions are stored in the action log 320.

Users may interact with various objects on the social networking system 100, including commenting on posts, sharing links, and checking-in to physical locations via a mobile device, accessing content items in a sequence, or other interactions. Information describing these actions is stored in the action log 320. Additional examples of interactions with objects on the social networking system 100 included in the action log 320 include commenting on a photo album, enabling communications between users, becoming a fan of a musician, adding an event to a calendar, joining a group, becoming a fan of a brand page, creating an event, authorizing an application, using an application, and engaging in a transaction. Additionally, the action log 320 records a user's interactions with advertisements on the social networking system 100 as well as other applications operating on the social networking system 100.

The action log 320 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

The auction module 325 selects content from the content store 310, such as advertisements and recommendation units for presentation to a user. In some embodiments, the auction module 325 may also select different and/or additional types of content from the content store 310. The auction module 325 retrieves advertisements from the advertisement store, retrieves data from the recommendation unit store 314, and generates recommendation units based on the retrieved data. The auction module 325 selects one or more advertisements and one or more recommendation units for presentation to a social networking system user. In one embodiment, the auction module 325 determines a common unit of measurement for the expected values associated with retrieved advertisements and the scores associated with the recommendation units and selects an advertisement and a recommendation unit using the common unit of measurement.

For example, the auction module 325 determines expected values for the retrieved advertisements based on their associated bid amounts and generates recommendation values, which have the same unit of measure as the expected values, for the recommendation units. The auction module 325 may rank both advertisements and recommendation units based on their expected value and recommendation value, respectively, and select an advertisement and a recommendation unit based on the ranking. This allows the auction module 325 to use a common unit of measurement for both the advertisements and the bid values, simplifying selection of an advertisement and a bid value for presentation to a user, and maximizing value to the social networking system 100.

In another example, the auction module 325 maps a score associated with a recommendation unit to a recommendation value, allowing the recommendation unit to be more readily compared to advertisements, which have an associated expected value. This allows the auction module 325 to simplify selection of the suggestion content by using a single process to evaluate both advertisements and recommendation units. In one embodiment, the auction module 325 multiplies a recommendation unit's score by a pacing value to map the score to a recommendation value. In another embodiment, the pacing value is applied to different recommendation units and is determined by the social networking system 100 based on revenue received from advertisers so that a percentage of the received revenue is allocated to presentation of recommendation units. For example, the social networking system 100 may select a pacing value so that a predetermined percentage (e.g., 30%) of the revenue from advertisers is allocated for recommendation units. The social networking system 100 may modify the pacing value to maintain a predetermined percentage of recommendation units to advertising revenue or may alter the pacing value to change this percentage.

In one embodiment, the auction module 325 selects advertisements and recommendation units by determining a recommendation value for recommendation units having the same unit of measurement as the expected value for advertisements. The auction module 325 then compares advertisements and recommendations using their expected value and recommendation value, respectively. In other embodiments, the auction module 325 may determine a suitable common unit of measurement for the advertisements and convert the recommendation unit scores and the advertisement expected values into the common unit of measurement. Selection of one or more advertisements and one or more recommendation units is further described below in conjunction with FIG. 4.

In one embodiment, an edge store 330 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, by, for example, expressing interest in a page on the social networking system, sharing a link with other users of the social networking system, and commenting on posts made by other users of the social networking system. The edge store 330 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 330, in one embodiment. In some embodiments, connections between users may be stored in the user profile store 305, or the user profile store 310 may access the edge store 330 to determine connections between users.

The display generator 335 determines when a social networking system user has requested information be displayed and retrieves content from the content store 310 for presentation to the social networking system user. The display generator 335 may also control the layout and format of the information displayed to the social networking system user. In one embodiment, the display generator 335 presents different types of content in different regions. For example, content describing actions taken by other users of the social networking system 100 connected to the user is displayed in a first region while other content, such as advertisements and recommendation units, are displayed in a second region. The display generator 335 also retrieves the one or more advertisements and the one or more recommendation units selected by the auction module 325 for presentation to a user.

In one embodiment, the display generator 335 organizes recommendation units and advertisements presented to a user as suggested content to increase the likelihood of the user interacting with the suggestion content. Increasing the likelihood of user interaction with recommendation units and/or advertisements also increases the value of the recommendation units and/or advertisements to the social networking system 100. For example, the display generator 335 organizes advertisements or recommendation units so the highest-value content is most prominently displayed or so the content most relevant to actions or characteristics of the user is most prominently displayed. In other examples, the display generator 335 displays advertisements and/or recommendation units to a user as a function of time, user status, user usage patterns, or other suitable user data.

The web server 340 links the social networking system 100 via the network 220 to the one or more client devices 210, as well as to the one or more third party websites 230. The web server 340 serves web pages, as well as other web-related content, such as Java, Flash, XML and so forth. The web server 340 may provide the functionality of receiving and routing messages between the social networking system 100 and the client device 210, for example, instant messages, queued messages (e.g., email), text and SMS (short message service) messages, or messages sent using any other suitable messaging technique. A user may send a request to the web server 340 to upload information, for example, images or videos that are stored in the content store 310. Additionally, the web server 340 may provide API functionality to send data directly to native client device operating systems, such as iOS®, ANDROID™, webOS® or RIM.

Content Item Selection

Figure 4:
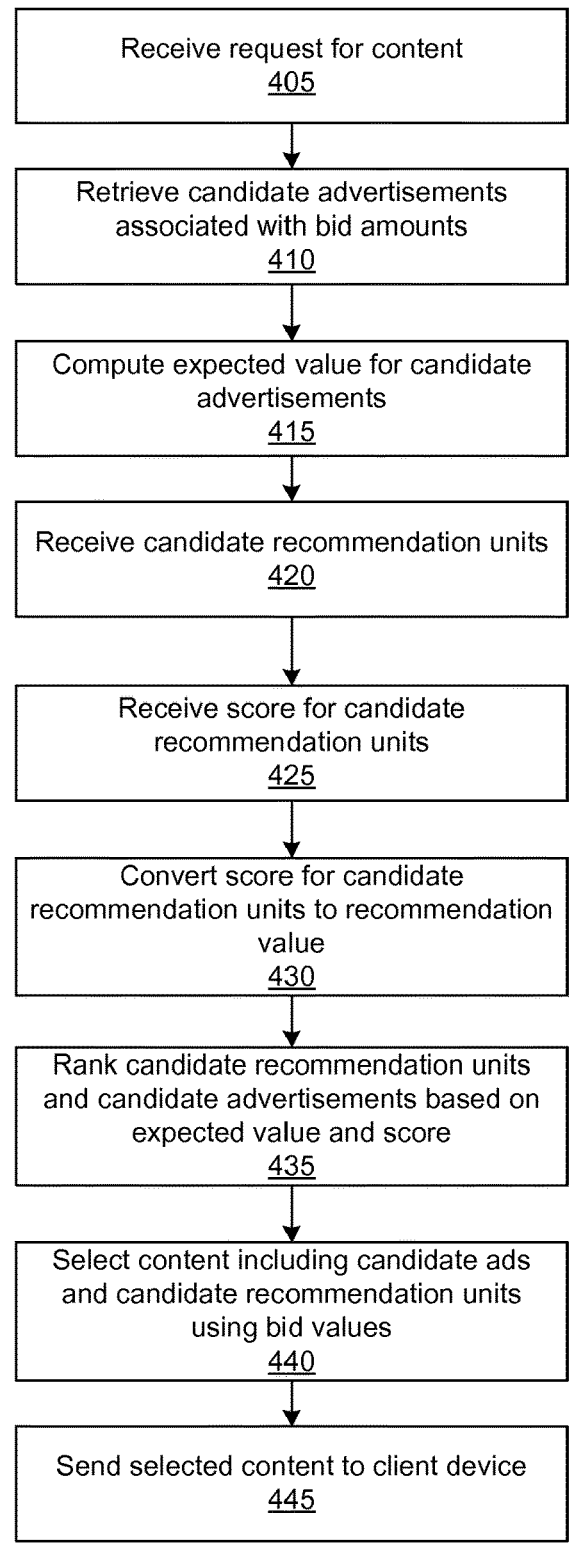
FIG. 4 is a flow chart of a method for selecting content items to be displayed, in accordance with an embodiment of the invention.

FIG. 4 illustrates one embodiment of a method 400 for selecting a set of advertisements and/or recommendation units for presentation to a user. The social networking system 100 receives 405 a request for content from a client device 210 associated with a viewing user. For example, the social networking system 100 receives 405 a request from the viewing user for a display including narrative data and suggestion data, such as shown above in conjunction with FIG. 1. Advertisements that are candidates for display to the user ("candidate advertisements") are retrieved 410 along with their associated bid values from the advertisement store 312. In one embodiment, the candidate advertisements are retrieved 410 based on one or more attributes of the viewing user, based on actions by the viewing user, or based on other information about the viewing user. The candidate advertisements include content and a bid amount, as described above.

The bid amount of a candidate advertisement may have any suitable format for representing the compensation received by the social networking system 100 if the candidate advertisement is presented to the viewing user or if the viewing user interacts with a presented candidate advertisement. In some embodiments, the bid amount is a monetary value, while in other embodiments the bid amount is any quantity representing compensation from an advertiser to the social networking system 100. Different pricing models may be used to determine the bid amount, such as a cost-per-click ("CPC") model where the bid amount is based on a per-user-interaction with the candidate advertisement, a cost-per-impression ("CPI") model where the bid amount is based on the number of times a candidate advertisement is presented, or any suitable model.

Using the bid amounts of the candidate advertisements, the auction module 325 of the social networking system 100 computes 415 an expected value for each of the candidate advertisements. The expected value represents the value to the social networking system 100 of a candidate advertisement. For example, an expected value accounts for the probability of a user accessing the advertisement by multiplying an advertisement's bid amount by the probability of it being accessed by a user. In one embodiment, the advertisement's bid value is its expected value. In various embodiments, the expected value may be computed 415 in any suitable manner.

Recommendation units that are candidates for display to the viewing user ("candidate recommendation units") are received 420 by the auction module 325. In one embodiment, the auction module 325 generates recommendation units from data in the recommendation unit store 314 and data from one or more of the user profile store 305 and the action log 320. In other embodiments, the auction module 325 receives 415 the recommendation units from the recommendation unit store 314 or from any suitable source. In one embodiment, the candidate recommendation units are received 420 based on one or more attributes of the viewing user, based on actions by the viewing user or based on other information about the viewing user. A score associated with each of the candidate recommendation units is also received 425. Hence, a candidate recommendation unit describes a suggested action for the viewing user in the social networking system 100 while the recommendation unit's score represents the value to the social networking system 100 if the recommendation unit is converted, as described above.

However, the expected values and the scores likely have different units of measurement, as the expected values represent compensation to the social networking system 100 while the scores are based on the value of information obtained by the social networking system if a user interacts with a recommendation unit. Accordingly, the auction module 325 converts 430 scores associated with candidate recommendation units into recommendation values having a unit of measurement common with the expected values of the advertisements. This simplifies selection of one or more candidate recommendation units and one or more advertisements by using a common unit of measurement to describe the benefit to the social networking system 100 provided by advertisements and recommendation units. In one embodiment, a pacing value, which is further described above, is applied to the score to convert 430 the score to a recommendation value. For example, the score is multiplied by the pacing value to convert the score to a recommendation value.

In other embodiments, the expected value of advertisements may be converted into an advertisement score that has the same units of measurement as the score of recommendation units. Alternatively, the scores and expected values are both converted into a common unit of measurement. Hence, the auction module 325 determines a common unit of measurement for both the advertisements and the recommendation units, and then calculates a value for each advertisement and each recommendation unit in the common unit of measurement. By converting scores and expected values to a common unit of measurement, the auction module 325 simplifies selection of content by allowing a single process to be used for identifying both recommendation units and advertisements. In one embodiment, the auction module 325 ranks 435 the recommendation units and candidate advertisements together based on the common unit of measurement calculated for the scores and expected values. For example, the auction module 325 produces a unified list including recommendation units and advertisements ranked according to the common unit of measurement. The auction module 325 may rank 435 the candidate advertisements according to their expected values and the candidate recommendation units according to their recommendation values.

The auction module 325 selects 440 content based on the ranking, with the content including candidate recommendation units and/or candidate advertisements. In one embodiment, the content includes at least one candidate recommendation unit and at least one candidate advertisement. For example, the auction module 325 selects 440 the candidate advertisement having the highest expected value, relative to the expected values, and the candidate recommendation unit having the highest recommendation value, relative to the recommendation values. Alternatively, content having a maximum expected value or maximum recommendation value is selected 440 from the unified list for presentation in a specific region, or "slot" of the suggestion content. Because the expected value and recommendation value have the same units of measurement, the selected content may be either a recommendation unit or an advertisement.

The auction module 325 may apply one or more rules when selecting 440 the content. For example, a rule may specify a number of advertisements included in the content and a number of recommendation units included in the content, causing the selected content to include both recommendation units and advertisements. As another example, one or more rules may specify a minimum number of advertisements and/or recommendation units included in the content. Similarly, a rule may specify a maximum number of advertisements and/or recommendation units included in the selected content.

In other embodiments, the expected values and the recommendation values are used in an auction process for different slots in the suggestion content where the content presented in a slot is the candidate advertisement or candidate recommendation unit having the expected value or recommendation value. In one embodiment, at least one slot in the suggestion content is designated for a recommendation unit and at least one slot in the suggestion content is designated for an advertisement. In some implementations of an auction process, an expected value or a recommendation value may be modified by a quality metric reflecting the relevance of a candidate advertisement or recommendation unit, respectively, to one or more characteristics of the viewing user. The selected one or more candidate advertisements and one or more candidate recommendation units are sent 445 to the client device for display to the viewing user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving a request for content from a viewing user of an online system;
retrieving a plurality of candidate content items for the viewing user;
retrieving a plurality of candidate recommendation units for the viewing user, each candidate recommendation unit including a recommendation by the online system for the viewing user to perform an action which would increase user engagement with the online system;
prioritizing one or more of the candidate content items and the candidate recommendation units to fill a limited display space of a user interface for the viewing user by applying a common valuation scheme for valuing the candidate content items versus the candidate recommendation units, the common valuation scheme comprising:
predicting a likelihood of the viewing user interacting with for each of the candidate content items;
computing a score in a first dimension for each of the candidate content items based on the predicted likelihood;
determining a likelihood of the viewing user interacting with each of the candidate recommendation units;
determining a score in a second dimension for each of the candidate recommendation units, the score based on a value to the online system of the viewing user performing the action recommended by the candidate recommendation unit and the likelihood of the viewing user interacting with the candidate recommendation unit; and
converting the scores in the first dimension or the scores in the second dimension into a common dimension for comparison as the common valuation scheme;
ranking the candidate content items and the candidate recommendation units together in a unified list based on the converted scores in the common dimension;
selecting content for presentation to the viewing user based on the ranking, the content including one or more content items and one or more recommendation units;
organizing the selected content within the limited display space of the user interface according to the ranking; and
sending the user interface comprising the selected content for display to the viewing user.

2. The computer-implemented method of claim 1, wherein the converting comprises:
converting the scores in the first dimension into the common dimension, where the common dimension is the second dimension.

3. The computer-implemented method of claim 1, wherein the converting comprises:
converting the scores in the second dimension into the common dimension, where the common dimension is the first dimension.

4. The computer-implemented method of claim 1, wherein the converting comprises:
applying a pacing value to the scores in the second dimension, the pacing value specifying a conversion factor from the scores in the second dimension to the scores in the common dimension.

5. The computer-implemented method of claim 4, wherein the pacing value specifies a percentage of recommendation units to be included in the selected content for presentation.

6. The computer-implemented method of claim 1, wherein the score in the second dimension is based on at least one of the group consisting of: prior interaction with recommendation units by the viewing user, other users to whom the viewing user is connected, and a probability of the viewing user interacting with the candidate recommendation unit.

7. The computer-implemented method of claim 1, wherein a candidate recommendation unit includes at least one of the group consisting of: content providing a suggestion for the viewing user to establish a connection with another user of the online system, content identifying an event for the viewing user to attend, content identifying an application, and content identifying a group.

8. The computer-implemented method of claim 1, wherein selecting content for presentation to the viewing user based on the ranking comprises:
identifying the one or more content items and the one or more recommendation units having a highest ranking on the unified list; and
selecting the one or more content items and one or more recommendation units having the highest ranking on the unified list for presentation to the viewing user.

9. The computer-implemented method of claim 1, wherein selecting content for presentation to the viewing user based on the ranking comprises:
applying one or more rules to the ranking, the one or more rules specifying a number of content items or a number of recommendation units included in the content for presentation.

10. A non-transitory computer readable storage medium having instructions encoded thereon that, when executed by a processor, cause the processor to perform the steps including:
receiving a request for content from a viewing user of an online system;
retrieving a plurality of candidate content items for the viewing user;
retrieving a plurality of candidate recommendation units for the viewing user, each candidate recommendation unit including a recommendation by the online system for the viewing user to perform an action which would increase user engagement with the online system;
prioritizing one or more of the candidate content items and the candidate recommendation units to fill a limited display space of a user interface for the viewing user by applying a common valuation scheme for valuing the candidate content items versus the candidate recommendation units, the common valuation scheme comprising:
predicting a likelihood of the viewing user interacting with for each of the candidate content items;
computing a score in a first dimension for each of the candidate content items based on the predicted likelihood;
determining a likelihood of the viewing user interacting with each of the candidate recommendation units;
determining a score in a second dimension for each of the candidate recommendation units, the score based on a value to the online system of the viewing user performing the action recommended by the candidate recommendation unit and the likelihood of the viewing user interacting with the candidate recommendation unit; and converting the scores in the first dimension or the scores in the second dimension into a common dimension for comparison as the common valuation scheme;

ranking the candidate content items and the candidate recommendation units together in a unified list based on the converted scores in the common dimension;

selecting content for presentation to the viewing user based on the ranking, the content including one or more content items and one or more recommendation units;

organizing the selected content within the limited display space of the user interface according to the ranking user interface; and sending the user interface comprising the selected content for display to the viewing user.

11. The non-transitory computer readable storage medium of claim 10, wherein the converting comprises:

converting the scores in the first dimension into the common dimension, where the common dimension is the second dimension.

12. The non-transitory computer readable storage medium of claim 10, wherein the converting comprises:

converting the scores in the second dimension into the common dimension, where the common dimension is the first dimension.

13. The non-transitory computer readable storage medium of claim 10, wherein the converting comprises:

applying a pacing value to the scores in the second dimension, the pacing value specifying a conversion factor from the scores in the second dimension to the scores in the common dimension.

14. The non-transitory computer readable storage medium of claim 10, wherein the pacing value specifies a percentage of recommendation units to be included in the selected content for presentation.

15. The non-transitory computer readable storage medium of claim 10, wherein the score in the second dimension is based on at least one of the group consisting of: prior interaction with recommendation units by the viewing user, other users to whom the viewing user is connected, and a probability of the viewing user interacting with the candidate recommendation unit.

16. The non-transitory computer readable storage medium of claim 10, wherein a candidate recommendation unit includes at least one of the group consisting of: content providing a suggestion for the viewing user to establish a connection with another user of the online system, content identifying an event for the viewing user to attend, content identifying an application, and content identifying a group.

17. The non-transitory computer readable storage medium of claim 10, wherein selecting content for presentation to the viewing user based on the ranking comprises:

identifying the one or more content items and the one or more recommendation units having a highest ranking on the unified list; and selecting the one or more content items and one or more recommendation units having the highest ranking on the unified list for presentation to the viewing user.

18. The non-transitory computer readable storage medium of claim 10, wherein selecting content for presentation to the viewing user based on the ranking comprises:

applying one or more rules to the ranking, the one or more rules specifying a number of content items or a number of recommendation units included in the content for presentation.

19. A system comprising:

a computer processor; and a computer-readable storage medium coupled to the computer processor, the computer-readable storage medium storing executable code, the code when executed by the computer processor performs steps comprising:

receiving a request for content from a viewing user of an online system;

retrieving a plurality of candidate content items for the viewing user;

retrieving a plurality of candidate recommendation units for the viewing user, each candidate recommendation unit including a recommendation by the online system for the viewing user to perform an action which would increase user engagement with the online system;

prioritizing one or more of the candidate content items and the candidate recommendation units to fill a limited display space of a user interface for the viewing user by applying a common valuation scheme for valuing the candidate content items versus the candidate recommendation units, the common valuation scheme comprising:

predicting a likelihood of the viewing user interacting with for each of the candidate content items;

computing a score in a first dimension for each of the candidate content items based on the predicted likelihood;

determining a likelihood of the viewing user interacting with each of the candidate recommendation units;

determining a score in a second dimension for each of the candidate recommendation units, the score based on a value to the online system of the viewing user performing the action recommended by the candidate recommendation unit and the likelihood of the viewing user interacting with the candidate recommendation unit; and converting the scores in the first dimension or the scores in the second dimension into a common dimension for comparison as the common valuation scheme;

ranking the candidate content items and the candidate recommendation units together in a unified list based on the converted scores in the common dimension;

selecting content for presentation to the viewing user based on the ranking, the content including one or more content items and one or more recommendation units;

organizing the selected content within the limited display space of the user interface according to the ranking; and sending the user interface comprising the selected content for display to the viewing user.

20. The system of claim 19, wherein the converting comprises:

applying a pacing value to the scores in the second dimension, the pacing value specifying a conversion factor from the scores in the second dimension to the scores in the common dimension.

* * * * *